US011258903B2

(12) United States Patent
Shore

(10) Patent No.: US 11,258,903 B2
(45) Date of Patent: Feb. 22, 2022

(54) SYSTEM AND METHOD FOR SECURE CALL ROUTING AND QUEUING

(71) Applicant: Secure Route, Inc., Northfield, OH (US)

(72) Inventor: John Viv Shore, Playa Del Rey, CA (US)

(73) Assignee: SECURE ROUTE, INC., Northfield, OH (US)

( * ) Notice: Subject to any disclaimer, the term of this patent is extended or adjusted under 35 U.S.C. 154(b) by 0 days.

(21) Appl. No.: 15/143,286

(22) Filed: Apr. 29, 2016

(65) Prior Publication Data

US 2017/0318157 A1 Nov. 2, 2017

Related U.S. Application Data

(60) Provisional application No. 62/154,597, filed on Apr. 29, 2015, provisional application No. 62/234,421, filed on Sep. 29, 2015.

(51) Int. Cl.
H04M 3/42 (2006.01)
H04M 3/00 (2006.01)
H04M 5/00 (2006.01)
H04L 12/66 (2006.01)
H04M 3/523 (2006.01)
(Continued)

(52) U.S. Cl.
CPC ............ *H04M 3/523* (2013.01); *H04L 67/02* (2013.01); *H04M 3/42008* (2013.01); *H04M 3/42314* (2013.01); *H04M 3/5158* (2013.01)

(58) Field of Classification Search
CPC ............ H04M 3/5183; H04M 3/5166; H04M 3/5191; H04M 3/5233; H04M 3/523; H04M 3/5232; H04M 3/5235; H04M 3/5175; H04M 3/51; H04M 7/006; H04M 3/42365; H04M 2201/42; H04M 2203/2011; H04Q 3/64
USPC ............ 379/265.09, 265.12, 265.13, 265.11, 379/266.01, 265.02, 265.03, 265.05; 705/7.15, 7.14; 370/352
See application file for complete search history.

(56) References Cited

U.S. PATENT DOCUMENTS 6,173,052 B1 * 1/2001 Brady ............... H04M 3/42323
379/265.01
6,327,363 B1 * 12/2001 Henderson ............. G06Q 20/04
379/265.01
(Continued)

*Primary Examiner* — Ahmad F. Matar
*Assistant Examiner* — Kharye Pope
(74) *Attorney, Agent, or Firm* — Orrick, Herrington & Sutcliffe LLP

(57) ABSTRACT

An agent queuing system implemented without relying on a private branch exchange. The queuing system can be cloud-based and routes calls to agents, for example, through a first-in/first-out (FIFO) queue. Clients are assigned a unique number that identify one or more queues. When a call is received, a database maintains the unique number that was called and the associated company information is retrieved, along with any queues allocated for their company. A call is placed to the next available agent from the selected queue. A recording is played to the agent identifying the queue the call is arriving from and the agent is prompted to accept the call. If the call is accepted, the agent is taken out of the available agent pool for the duration of the call. The call can be routed without exposing the phone numbers of the caller or agent involved in the call.

15 Claims, 7 Drawing Sheets

(51) Int. Cl.
  *H04M 3/51*        (2006.01)
  *H04L 29/08*       (2006.01)
  *H04L 67/02*       (2022.01)

(56) References Cited

U.S. PATENT DOCUMENTS

| | | | | |
|---|---|---|---|---|
| 6,373,937 B1* | 4/2002 | Yegoshin | | H04M 3/5191 |
| | | | | 379/265.09 |
| 6,654,815 B1* | 11/2003 | Goss | | H04L 29/06 |
| | | | | 709/248 |
| 7,899,177 B1* | 3/2011 | Bruening | | H04M 3/42068 |
| | | | | 379/265.01 |
| 7,929,685 B1* | 4/2011 | Boyet | | H04M 3/5232 |
| | | | | 379/265.02 |
| 8,582,475 B1* | 11/2013 | Marghescu | | H04M 3/5183 |
| | | | | 370/270 |
| 8,625,760 B1* | 1/2014 | Peden | | 379/142.04 |
| 8,693,655 B1* | 4/2014 | Chau | | H04M 3/42008 |
| | | | | 379/201.01 |
| 9,338,289 B1* | 5/2016 | Goyal | | G06F 16/29 |
| 9,560,210 B1* | 1/2017 | Noble, Jr. | | H04M 15/60 |
| 2003/0147519 A1* | 8/2003 | Jain | | H04M 3/42008 |
| | | | | 379/211.02 |
| 2003/0198326 A1* | 10/2003 | Wei | | H04M 15/06 |
| | | | | 379/142.14 |
| 2003/0231647 A1* | 12/2003 | Petrovykh | | H04L 12/58 |
| | | | | 370/429 |
| 2004/0081309 A1* | 4/2004 | Bickford | | H04M 3/51 |
| | | | | 379/265.02 |
| 2006/0126816 A1* | 6/2006 | Shaffer | | H04M 3/5183 |
| | | | | 379/265.02 |
| 2007/0064895 A1* | 3/2007 | Wong | | H04M 3/42051 |
| | | | | 379/142.09 |
| 2007/0258576 A1* | 11/2007 | Klein | | H04M 3/42374 |
| | | | | 379/265.02 |
| 2008/0025488 A1* | 1/2008 | Dean | | H04M 3/42008 |
| | | | | 379/201.11 |
| 2008/0126216 A1* | 5/2008 | Flensted-Jensen | | G06Q 30/04 |
| | | | | 705/26.1 |
| 2008/0187117 A1* | 8/2008 | Maugars | | H04M 1/575 |
| | | | | 379/121.01 |
| 2008/0275788 A1* | 11/2008 | Altberg | | G06Q 20/10 |
| | | | | 705/26.43 |
| 2009/0003539 A1* | 1/2009 | Baird | | H04M 3/493 |
| | | | | 379/88.01 |
| 2009/0122972 A1* | 5/2009 | Kaufman | | H04M 3/5125 |
| | | | | 379/265.12 |
| 2009/0296694 A1* | 12/2009 | Kalyanpur | | H04L 12/66 |
| | | | | 370/352 |
| 2010/0232594 A1* | 9/2010 | Lawson | | H04M 3/42323 |
| | | | | 379/220.01 |
| 2011/0142218 A1* | 6/2011 | Kosaraju | | H04L 9/3236 |
| | | | | 379/142.02 |
| 2011/0307547 A1* | 12/2011 | Backer | | G06Q 10/02 |
| | | | | 709/203 |
| 2012/0100830 A1* | 4/2012 | Barber | | H04M 3/42195 |
| | | | | 455/410 |
| 2012/0114112 A1* | 5/2012 | Rauschenberger | | H04M 3/5166 |
| | | | | 379/265.02 |
| 2012/0314847 A1* | 12/2012 | Jaiswal | | H04M 1/72561 |
| | | | | 379/88.01 |
| 2012/0321070 A1* | 12/2012 | Smith | | H04M 3/5141 |
| | | | | 379/265.09 |
| 2013/0070918 A1* | 3/2013 | Siminoff | | H04M 3/42068 |
| | | | | 379/142.06 |
| 2013/0129075 A1* | 5/2013 | Whitaker | | H04M 3/523 |
| | | | | 379/265.09 |
| 2013/0183949 A1* | 7/2013 | Sulmar | | H04L 63/0421 |
| | | | | 455/415 |
| 2013/0218983 A1* | 8/2013 | Richard | | H04L 51/28 |
| | | | | 709/206 |
| 2013/0223616 A1* | 8/2013 | Segall | | H04M 3/42365 |
| | | | | 379/265.09 |
| 2013/0336472 A1* | 12/2013 | Fahlgren | | H04M 3/523 |
| | | | | 379/266.01 |
| 2014/0307863 A1* | 10/2014 | Snyder | | H04M 3/5233 |
| | | | | 379/265.09 |
| 2015/0016600 A1* | 1/2015 | Desai | | H04M 3/5232 |
| | | | | 379/266.07 |
| 2015/0281435 A1* | 10/2015 | Charlson | | H04M 3/42059 |
| | | | | 379/142.06 |
| 2016/0180381 A1* | 6/2016 | Kaiser | | G06Q 30/0277 |
| | | | | 705/14.53 |
| 2017/0118329 A1* | 4/2017 | Hou | | H04M 3/42153 |

\* cited by examiner

SYSTEM AND METHOD FOR SECURE CALL ROUTING AND QUEUING

CROSS-REFERENCE TO RELATED APPLICATIONS

This application claims priority to U.S. Provisional Patent Application No. 62/154,597, which was filed Apr. 29, 2015, and to U.S. Provisional Patent Application No. 62/234,421, which was filed Sep. 29, 2015. The disclosure of the Provisional patent applications are herein incorporated by reference in their entirety and for all purposes.

FIELD

The present disclosure relates generally to communications systems and more specifically, but not exclusively, to telephony systems for managing call routing.

BACKGROUND

Conventional telephony systems can provide business solutions ranging from small key telephone systems to large-scale private branch exchanges. Business telephone systems include multiple central office (CO) lines that are directly controllable from multiple telephone stations and provide solutions related to call handling.

For example, a private branch exchange (PBX) is a telephone exchange or switching system that serves a private organization that has many telephone extensions, but fewer telephone lines (often referred to as "trunks") that connect the organization to a global telecommunications network. Specifically, the PBX performs concentration of central office lines, or trunks, and provides intercommunication between a several telephone stations in the organization. The central office lines provide connections to a public switched telephone network (PSTN) and permits the shared use of these lines between all stations in the organization. Each PBX-connected station, such as a telephone set, a fax machine, or a computer modem, is often referred to as an extension and has a designated extension telephone number that may or may not be mapped automatically to the numbering plan of the central office and the telephone number block allocated to the PBX.

The PBX performs various functions including establishing connections (circuits) between the telephone sets of two users (e.g., mapping a dialed number to a physical phone, ensuring the phone isn't already busy), maintaining such connections as long as the users require them, disconnecting those connections, and providing information for accounting purposes.

Initially, PBX systems offered the primary advantage of cost savings for internal phone calls: handling the circuit switching locally reduced charges for telephone service via central-office lines. However, the expense of full-fledged PBX systems has put them out of reach of small businesses and individuals.

A PBX requires extensive setup, since it controls all routing of calls. Individual extensions have to be defined in the system. For example, an auto-attendant is often required to direct callers to extensions and queues.

As an additional drawback of conventional communication systems, the contact information of the users typically are exposed. For example, the privacy of users of a social media platform can be compromised if a phone number is exposed during an attempted call or communication through the social media platform. Unfortunately, with conventional communication systems, contact information is rarely kept private.

In view of the foregoing, a need exists for an improved communication system and method for secure call routing and queuing in an effort to overcome the aforementioned obstacles and deficiencies of conventional telephony systems.

Figure 1:
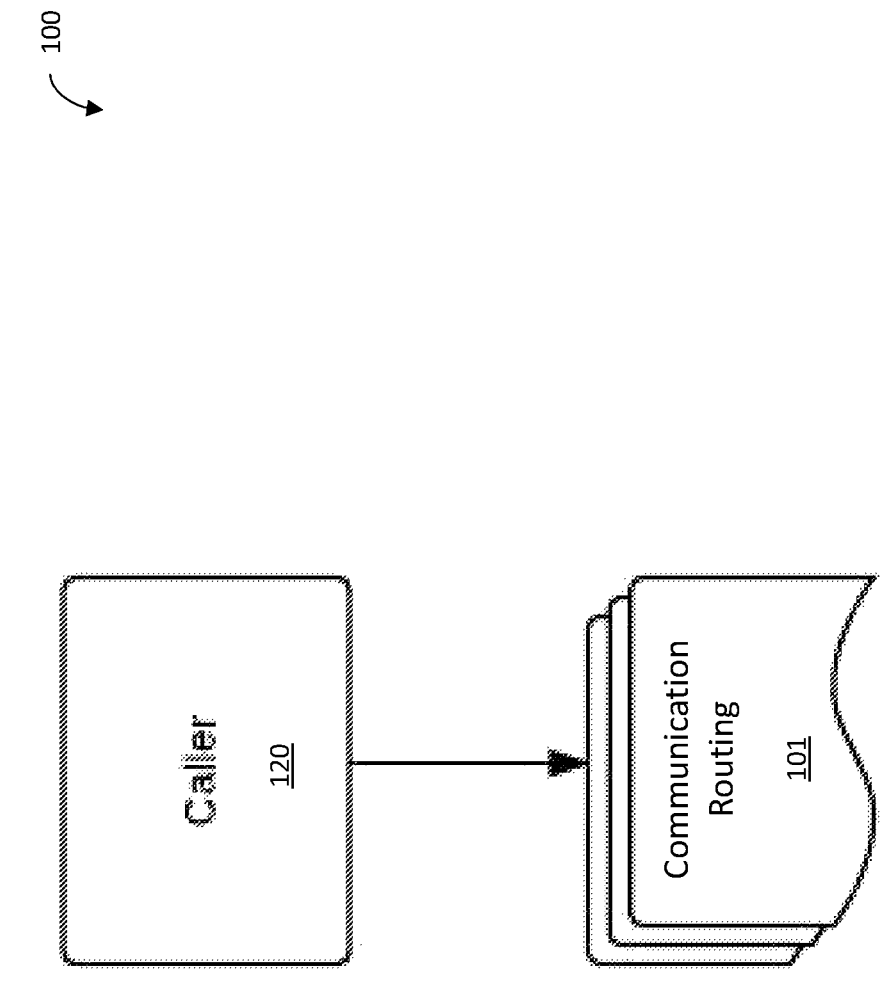
FIG. 1 is an exemplary top-level block diagram illustrating an embodiment of a communication management system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available telephony management systems are deficient because they fail to route and manage calls without a telephone exchange or switching system—such as a PBX, a communication routing and queueing system that provides a communication management system without the need for agents to be directly connected to a device can prove desirable and provide a basis for a wide range of communications applications, such as communication queueing as a service. This result can be achieved, according to one embodiment disclosed herein, by a communication management system 100 as illustrated in FIG. 1.

Turning to FIG. 1, calls between callers 120 and agents (shown in FIG. 3) can be routed through a communication routing system 101. The communication management system 100 advantageously provides a standalone solution that can connect one or more callers 120 with agents anonymously. For example, the communication routing system 101 can provide one or more communication identifiers to the callers 120 for queueing, routing, and other communication management services. In a preferred embodiment, the communication identifier provided to the callers 120 include a unique telephone number and/or an Internet Protocol (IP) address for voice over IP (VoIP) services. For example, a company that uses the communication management system 100 can be assigned a unique telephone number that is used to identify a specific queue of agents dedicated to handling their calls. This unique telephone number can also be used to lookup in databases to retrieve information specific to the company and retrieve the queues associated with the number.

In some embodiments, the calls from the callers 120 are anonymous, with caller identification masked, thereby removing the need for companies to invest in the high cost of a PBX.

Figure 2:
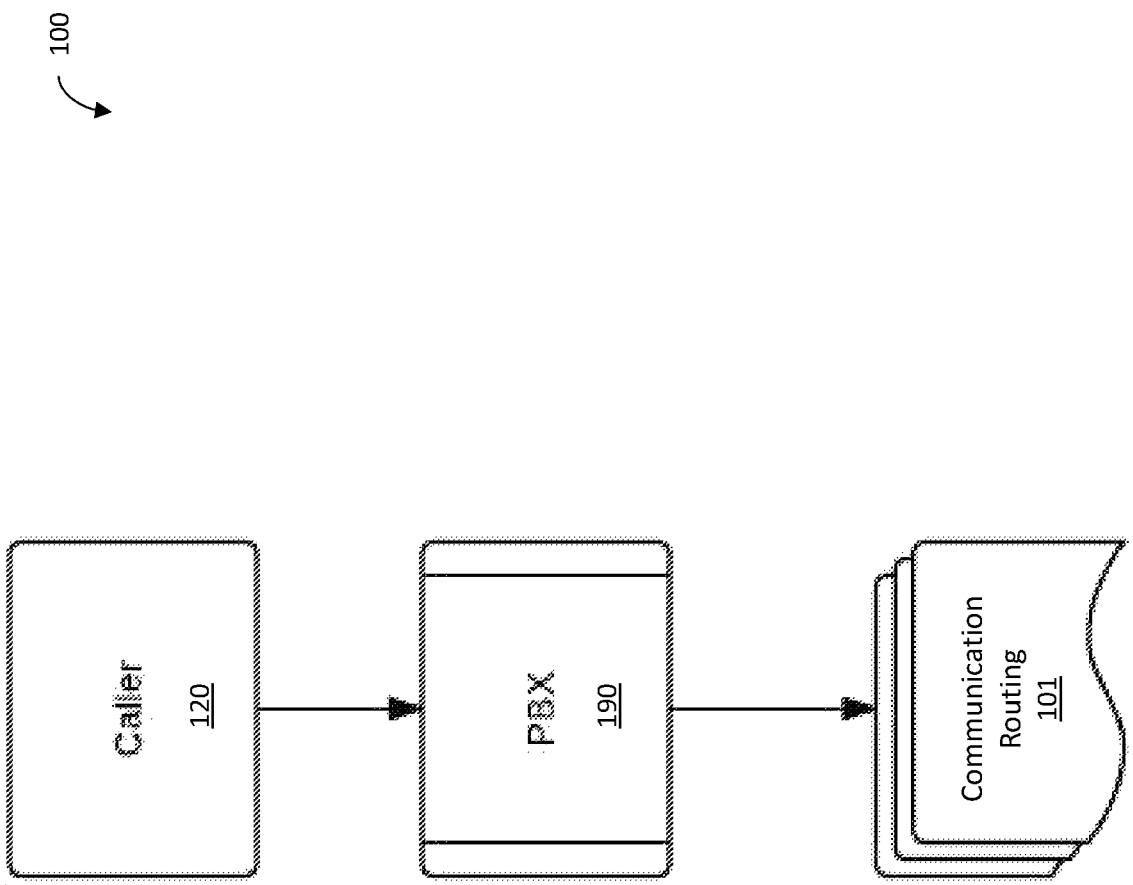
FIG. 2 is an exemplary top-level block diagram illustrating an alternative embodiment of the communication management system of FIG. 1.
Figure 3:
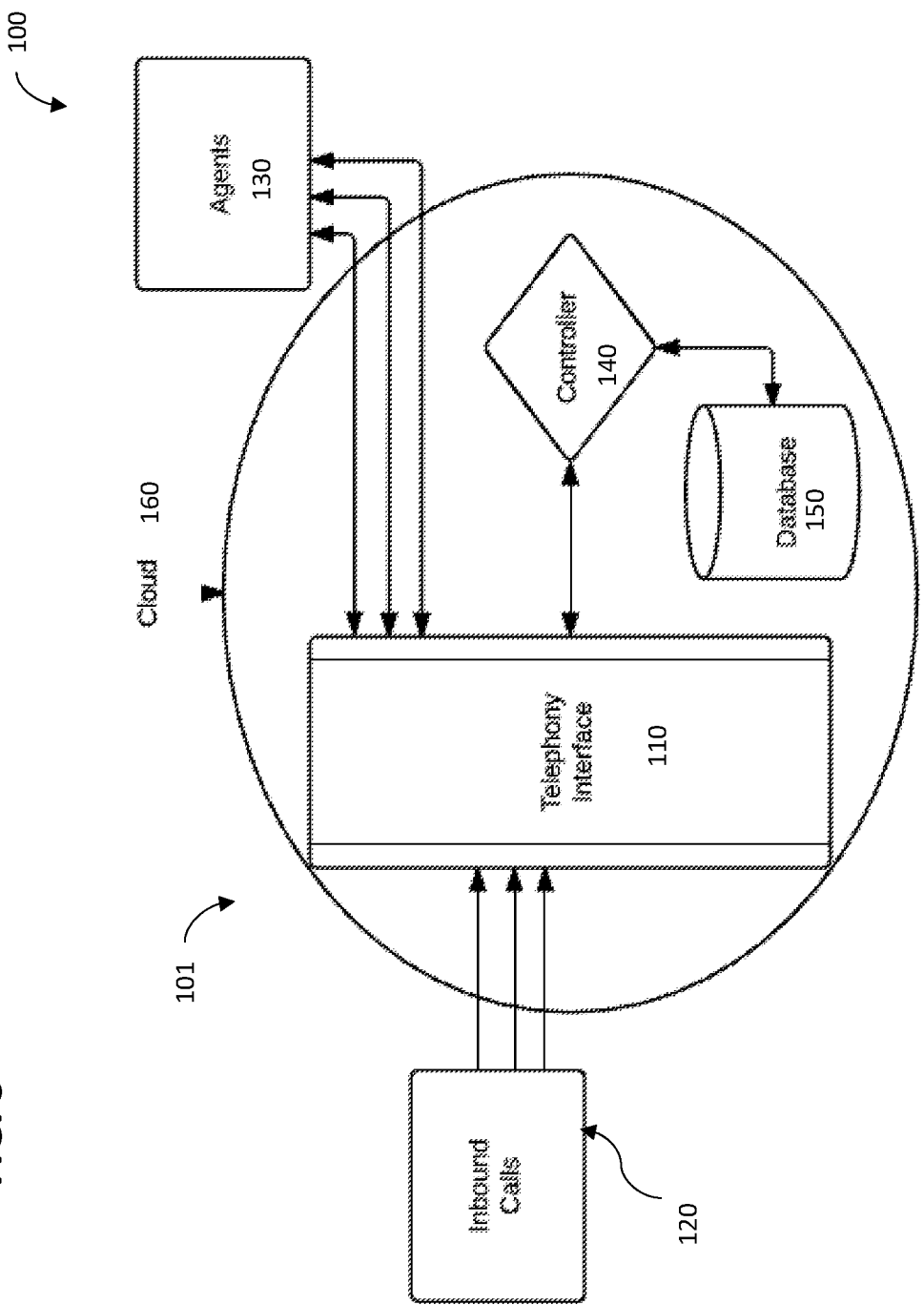
FIG. 3 is an exemplary top-level block diagram illustrating one embodiment of a detailed view of the communication routing system that can be used with the communication management system of FIG. 1.

In an alternative embodiment and with reference to FIG. 2, the communication management system 100 can be integrated with a current PBX 190 that does not include routing features, such as queueing, implemented by directing the one or more callers 120 through the PBX 190 to the communication routing system 101, such as over a data network (e.g., cloud, shown in FIG. 3). Similar to the communication management system 100 shown in FIG. 1, the PBX 190 can route callers 120 to the communication routing system 101 in any manner described herein, such as using the communication identifier of the communication routing system 101.

Turning to FIG. 3, the communication routing system 101 is shown as including a telephony interface 110 for management of inbound calls 120. The telephony interface 110 can include any telephony card, telephony board, and/or telephony platform (e.g., Asterisk, FreesSWITCH, GnuGK, SER, and so on). The telephony interface 110 answers calls, receives digits entered by the caller via the call 120, and routes calls to the appropriate destination. The telephony interface 110 can also record the calls 120. Stated in another way, in a model-view-controller (MVC) environment, the telephony interface 110 includes the view component of the environment.

Figure 6:
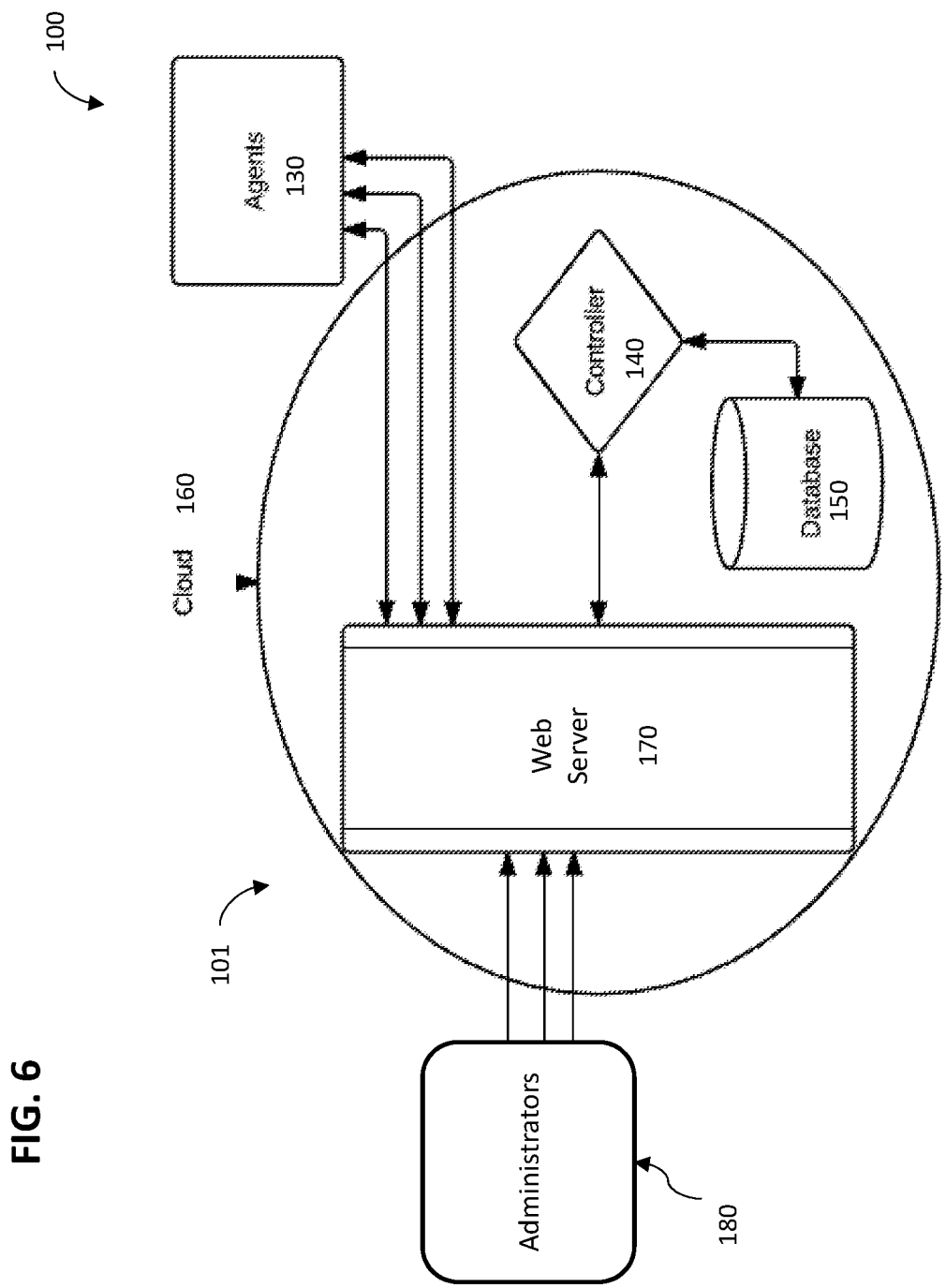
FIG. 6 is an exemplary top-level block diagram illustrating another embodiment of a detailed view of the communication routing system that can be used with the communication management system of FIG. 1.

The communication management system 100 is suitable for use with a wide range of agents 130. In one embodiment, the communication management system 100 can be used with multiple agents 130, such as one or more telephone operators and administrators (shown in FIG. 6).

In some embodiments, the agents 130 can log into and out of communication queues through a web server 170 (shown in FIG. 6), for example, to set their availability. When a selected agent 130 receives a call from a selected caller 120 through the telephony interface 110, the agent 130 is played a recording of a queue identifier and prompted to accept the selected call 120. If the agent 130 refuses the call 120, the agent 130 is placed in the back of the queue and the next available agent is called.

The ability for administrators (e.g., administrators 180 and/or agents 130) of the communication management system 100 to monitor their individual queues advantageously provides a self-contained queueing solution. In some embodiments, the agents 130 interact with the web server 170 through a network and software-based architecture. For example, a representational state transfer (REST) system can be used such that a REST application programming interface (API) provides the agents 130 a gateway into the web server 170. An alerting system discussed below can provide alerts including short message service (SMS), electronic mail (e-mail), and telephone calls, which can alert, for example, of not enough agents to service the calls in a queue, and other pre-defined categories. Recording of conversations can also be offered on a queue basis.

Returning to FIG. 3, the telephony interface 110 also is shown in communication with a controller 140. The controller 140 manages data flow for all communications and any communication between the telephony interface 110 and the database 150. In a preferred embodiment, the controller 140 is implemented using any functional programming language, including for example, Erlang. The controller 140 instructs the telephony interface 110 to route calls 120 and coordinates the queue of agents 130.

In some embodiments, the controller 140 communicates with the telephony interface 110 via event sockets. When an event is raised in the telephony interface 110 that has been previously subscribed to by the controller 140, the event will be communicated by the telephony interface 110 to the controller 140 to determine next actions to perform in the call management.

The database 150 is a container of the MVC environment. In some embodiments, the database 150 is implemented using relational databases, including, for example, PostgreSQL. The database 150 maintains the queue of agents 130 and other predefined settings for each application. Furthermore, the database 150 maintains database triggers—such as when there are not enough agents 130 to service calls—where alerts are generated to the agents 130 of the various companies. The controller 140 can manage all communication with the database 150.

In some embodiments, the database 150 maintains tables that include a list of companies, the association of the company and an incoming phone number, the queues of the agents 130, a list of the agents 130 for each queue, and a list of settings for the company, such as hours of operation and whether to record the calls. The queueing table implements any memory management queues and includes, for example first-in/first-out (FIFO) queue with a priority setting. For example, a priority setting includes a flag in the database 150 that indicates whether a selected agent 130 should be chosen to service a call if they are available in the queue. Selected agents 130 have priority as specified by the company will get priority routing to a call 120, then others will get consideration based on length of time they have been waiting in the queue. For example, this can include an index on the queue for the priority flag and inserted time. A queue table can also include incoming callers that want a call back from a selected agent 130, but do not want to wait on the phone. The tables in the database 150 will also provide the view of the status of the system to administrators 180 of the system, such as the number of agents 130 involved in calls in the queue and the number of current available agents available in the queue.

The communication management system 100 can also provide administrative views of the queue functions. In some embodiments, with reference to FIG. 6, the web server 170 can include, for example, a Hypertext Transfer Protocol (HTTP) high performance webserver based on Yaws, which can be implemented in Erlang, and/or an Apache-based web server. When a request for an administrative view comes into the web server 170, an Erlang process serves as the controller in accessing the data from the database and responding to the request. The administrative view includes the status of the agents 130 in the queue; which agents are involved in calls and a listing of the agents waiting in the queue and their order in the queue. Advantageously, this provides the advantage of allowing agents 130 and any other user of the communication management system 100 to be completely independent and isolated while using the system.

Figure 4:
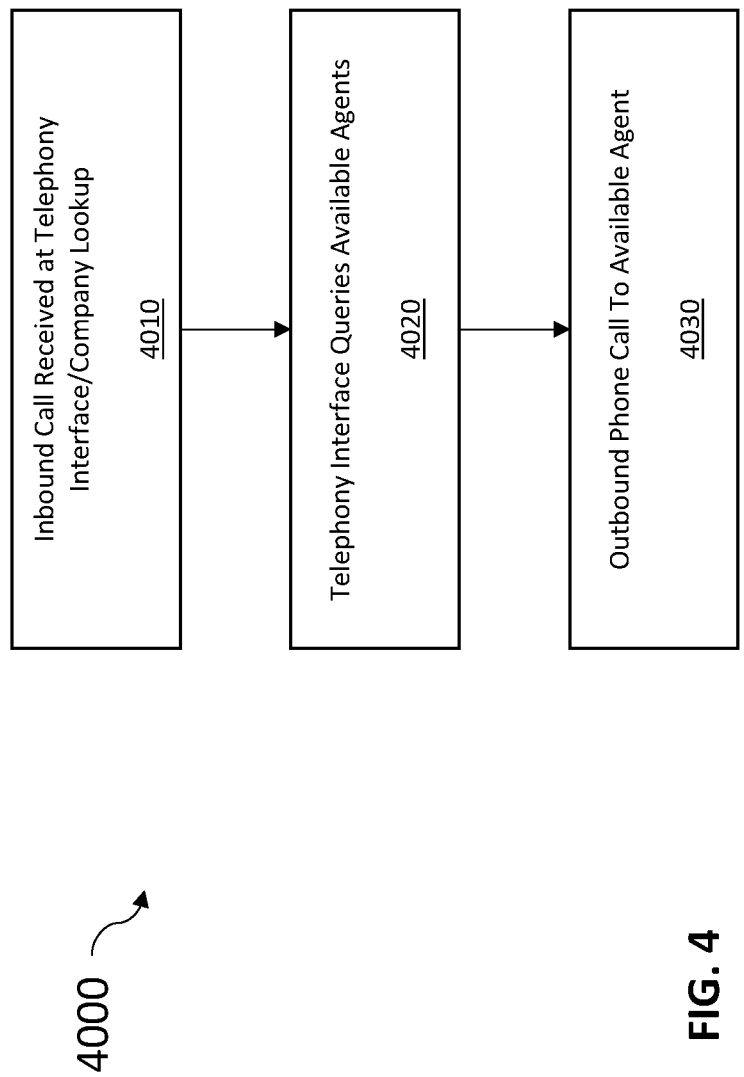
FIG. 4 is an exemplary flowchart illustrating an embodiment of securely routing a call using the communicating routing management system of FIG. 3.

The communication management system 100 can route inbound calls 120 in any suitable manner discussed above, including via an exemplary process 4000 for communication management, shown in FIG. 4. With reference to FIG. 4, the exemplary process 4000 for communication management is shown as including a plurality of processes, which need not be performed in the order depicted.

At 4010, the inbound calls 120 (shown in FIGS. 1-3) are received at the telephony interface 110 (shown in FIG. 3). As discussed in more detail above, a variety of methods are suitable for receiving the inbound calls 120. For example, each company using the communication management system 100 can be assigned a unique telephone number. Therefore, the unique telephone number can be used to identify a call queue, a call greeting, calling preferences, and so on for a particular company. In an even further embodiment, the use of a unique telephone number can also protect the privacy of the inbound call 120 (additionally and/or alternatively, any outbound calls of the agents 130). Stated in another way, the actual contact information for any party involved in the call (e.g., caller, agent 130, callee, and so on), does not need to be exposed in order to route a call or connect two parties. Instead, the unique telephone number serves as a proxy to connect callers without the need for displaying any actual contact information associated with users of the communication management system 100. Once a selected inbound call 120 is received, the telephony interface 110 queries available agents 130 for the particular company, at 4020, in any manner described herein.

For example, at 4020, the controller 140 queries the database 150, based on the unique telephone number, to identify the respective company that is assigned the unique telephone number. An outbound phone call is made to the next available agent in the queue for the selected company, at 4030.

Figure 5:
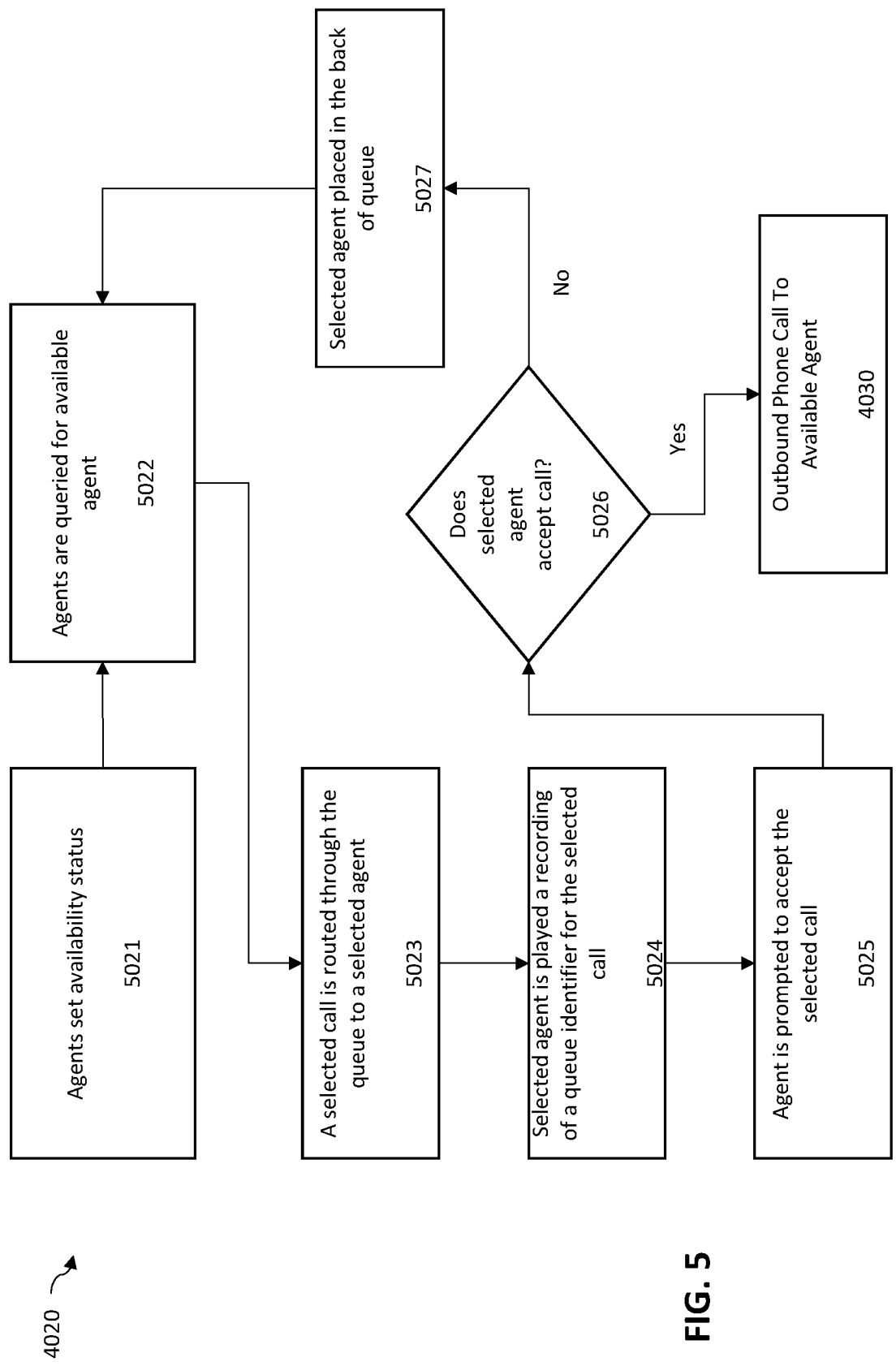
FIG. 5 is an exemplary flowchart illustrating the querying of the secure routing process of FIG. 4.

With reference now to FIG. 5, one embodiment of the process 4020 is described in further detail. Starting at 5021, the agents 130 for the identified company set their availability status. For example, the agents 130 can log into and out of communication queues through the web server 170 to set their availability.

The telephony interface 110 subsequently answers the call and the controller 140 queries the database 150 for the next available agent, at 5022. In some embodiments, this can include a table lookup for the selected company associated with the unique telephone number as discussed above. Once identified, the selected company can set preferences, create custom greetings, maintain their own queue of agents 130, and so on. Advantageously, this provides a personalized solution for each individual subscriber company for the communication management system 100.

The selected call 120 is routed to the selected agent from 5022, at 5023. In some embodiments, the selected call 120 is routed with additional data received from the call through the telephony interface 110. For example, the caller is played a custom greeting associated with the unique telephone number and may have been asked to enter series of digits for a predetermined menu item. The selected agent 130 is played a recording that identifies a queue identifier, at 5024. For example, the queue identifier can include a company name, the unique telephone number for the company, and/or a queue name (e.g., sales or support). In some embodiments, a selected agent 130 can be associated with one or more queues for one or more companies in the database 150. Accordingly, the queue identifier can include a recording identifying the particular queue that the selected call 120 is coming from and allows the agent 130 to accept the call. The agent 130 is prompted to accept or reject the call, at 5025.

If the agent 130 accepts the call, decision block 5026, the controller 140 directs the telephony interface 110 to connect the inbound and outbound call legs to connect the caller with the agent 130, at 4030. At this point the telephony interface 110 can perform call recording for the duration of the call (not shown). For the duration of the call the agent 130 is taken out of the pool for the available agents for the queue. If the agent refuses the call, at decision block 5026, the selected agent 130 is placed at the end of the queue, at 5027, and is available for another call from the queue.

In some embodiments, an alerting mechanism is initiated from a trigger in the database 150 (or via the controller 140). This trigger inserts records in an alert table (not shown) in the database 150. The Erlang service polls this table in minute intervals and processes the alerts by instructing the telephony interface to send out the alerts to the administrators 180 of the system via SMS, email or phone call. The alert table also acts as a history table, documenting the alerts that were sent.

Figure 7:
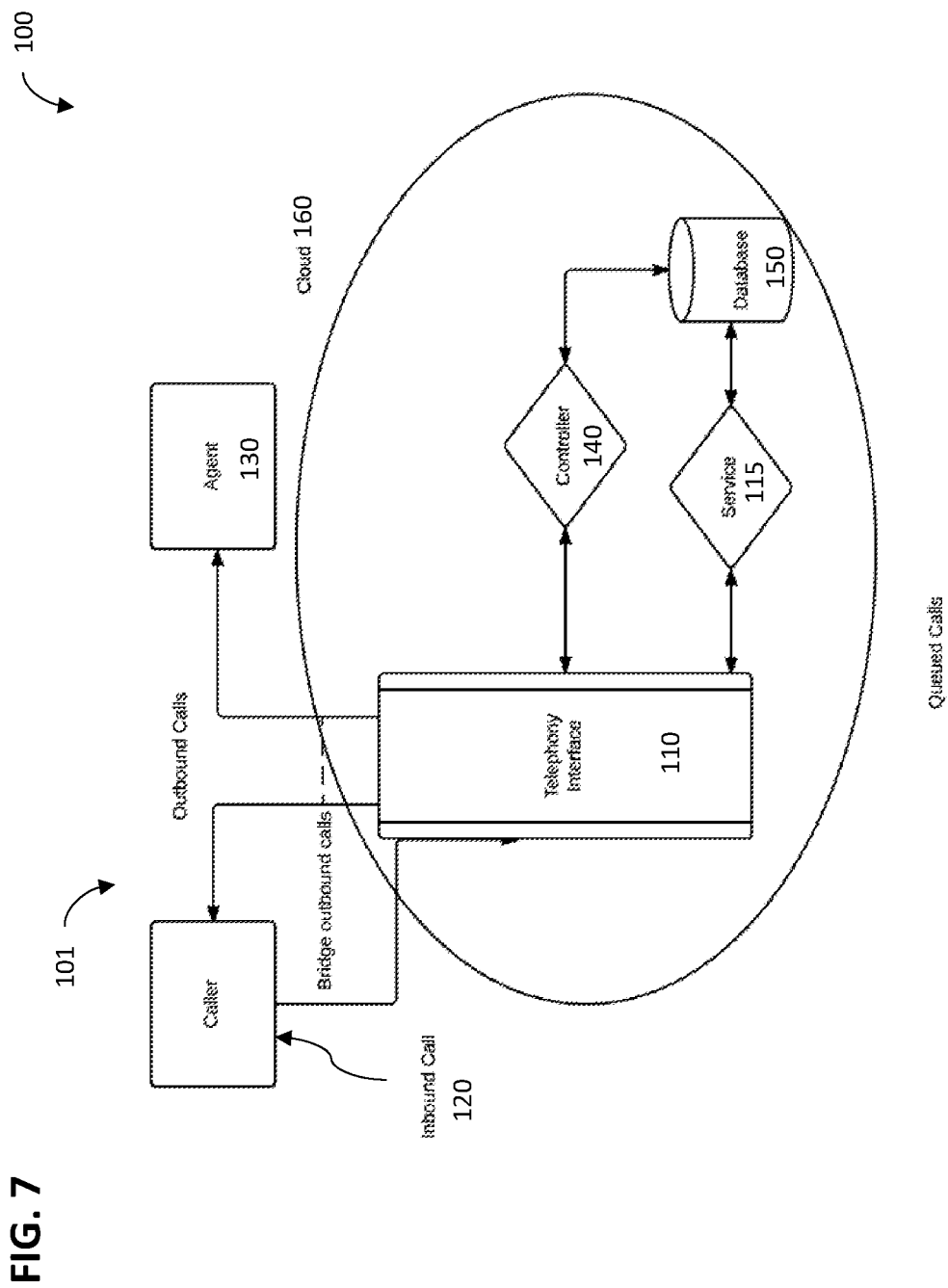
FIG. 7 is an exemplary top-level diagram illustrating an embodiment of a communication queueing management system that can be used with the communication management system of FIG. 3.

Turning to FIG. 7, in an alternative embodiment, a caller who has called (e.g., incoming call 120) in to a queue and is waiting for an agent 130 can request a callback (e.g., being prompted by the telephony interface 110 to push a digit and hang up), thereby scheduling a return call from the agent 130. When the caller decides to schedule a return call by pressing a predetermined key or digit on their telephone device, a record is added to a caller queue table in the database 150. An external service 115 polls the caller queue table from the database 150 for caller queue records, and when one is discovered, an available agent 130 is found in the agent table and is reserved for the call with the caller. An outbound call is initiated with the available agent 130, and a recording is played to the agent 130 for acceptance of the call and proceeds in a manner described with reference to process 4000.

In yet an alternative embodiment, a person can schedule a queue call via an external interface (e.g., via web, SMS message, email, and so on) by sending a REST call to the cloud, including in the call their phone number. The same steps are made to connect the agent and caller in this scenario, however the REST interface directly inserts the caller record in the database.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method of managing a plurality of incoming calls, each of the plurality of incoming calls being assigned a personal telephone number for communicating with a telephony interface over a public switched telephone network, the method comprising:

receiving a selected call of the incoming calls at the telephony interface, the selected call being received at the telephony interface via a selected caller dialing their assigned personal telephone number and directly identifying a selected queue using its assigned personal telephone number from a relational database;

querying available agents from the selected queue via a controller coupled to the telephony interface; and transferring the received call to a selected available agent via the controller through the telephony interface and protecting the privacy of the selected caller making the received selected call by assigning a unique telephone number to the selected caller that is different from an original number used to identify the selected caller and protecting the privacy of the selected available agent by assigning a unique agent telephone number to the selected available agent that is different from an original agent telephone number used to identify the selected available agent, the unique telephone number enabling communication with the selected caller over the public switched telephone network.

2. The method of claim 1, wherein the unique telephone number is associated with a key in a database for identifying the selected queue.

3. The method of claim 1, wherein the selected caller is associated with a selected company.

4. The method of claim 1, wherein said querying further comprises:
routing the selected call to the selected available agent;
prompting the selected available agent to accept the selected call, wherein said transferring occurring if the selected available agent accepts the selected call; and
repeating said querying for a next available agent in the selected queue if the selected available agent dismisses the selected call.

5. The method of claim 1, further comprising:
receiving a second call of the incoming calls at the telephony interface, the second call identifying a second queue;
querying a second group of available agents from the second queue via the controller coupled to the telephony interface; and
transferring the received call to a selected available agent of the second group via the controller through the telephony interface,
wherein the second queue is unique from the selected queue.

6. The method of claim 1, further comprising receiving agent status via a web server, and wherein said querying is based on the received agent status.

7. The method of claim 1, wherein said receiving the selected call comprises receiving the selected call from a private branch exchange.

8. The method of claim 1, wherein the transferring of the received call includes protecting the privacy of the available agents.

9. A communication management system for securely routing and queuing a plurality of inbound calls, each of the plurality of inbound calls being assigned a personal telephone number, the system comprising:

a telephony interface for receiving a selected call of the incoming calls, each assigned personal telephone number being used by a selected caller for dialing into the telephony interface over a public switched telephone network;
a database for maintaining one or more agent queues; and
a controller coupled to said telephony interface and to said database, said controller querying available agents from a selected queue and transferring the received call to a selected available agent through the telephony interface and protecting the privacy of the selected caller making the received selected call by assigning a unique telephone number to the selected caller that is different from an original number used to identify the selected caller and protecting the privacy of the selected available agent by assigning a unique agent telephone number to the selected available agent that is different from an original agent telephone number used to identify the selected available agent, the unique telephone number enabling communication with the selected caller over a public switched telephone network,
wherein the selected call directly identified the selected queue using its assigned personal telephone number from a relational database.

10. The communication management system of claim 9, wherein the unique telephone number is associated with a key in a database for identifying the selected queue.

11. The communication management system of claim 9, wherein the selected caller is a selected company.

12. The communication management system of claim 9, wherein said controller:
routes the selected call to the selected available agent;
prompts the selected available agent to accept the selected call, the transferring occurring if the selected available agent accepts the selected call; and
repeats said querying for a next available agent in the selected queue if the selected available agent dismisses the selected call.

13. The communication management system of claim 9, further comprising a web server for receiving agent status, and said controller queries the available agents based on the received agent status.

14. The communication management system of claim 9, wherein said telephony interface receives the selected call from a private branch exchange.

15. The communication management system of claim 9, wherein said controller further masks the contact information of the available agents.

\* \* \* \* \*